United States Patent [19]

Quammen et al.

[11] Patent Number: 4,740,739
[45] Date of Patent: Apr. 26, 1988

[54] BATTERY CHARGING APPARATUS AND METHOD

[75] Inventors: Leon D. Quammen; James M. Hisle, both of Lexington, Ky.

[73] Assignee: Premier Engineered Products Corporation, Lexington, Ky.

[21] Appl. No.: 12,894

[22] Filed: Feb. 10, 1987

[51] Int. Cl.$^4$ ............................................. H02J 7/00
[52] U.S. Cl. ........................................ 320/14; 320/9; 320/21; 320/39
[58] Field of Search .................... 320/9, 14, 21, 39, 40

[56] References Cited

U.S. PATENT DOCUMENTS

| | | | |
|---|---|---|---|
| 2,503,179 | 4/1950 | Tichenor | 320/14 |
| 3,517,293 | 6/1970 | Burkett et al. | 320/14 |
| 3,609,503 | 9/1971 | Burkett et al. | 320/14 |
| 3,617,851 | 11/1971 | Du Puy | 320/22 |
| 3,732,481 | 5/1973 | Mas | 320/14 |
| 3,816,806 | 6/1974 | Mas | 320/20 |
| 4,211,969 | 7/1980 | Steigerwald | 320/14 |
| 4,385,269 | 5/1983 | Aspinwall et al. | 320/14 |

*Primary Examiner*—Patrick R. Salce
*Assistant Examiner*—Anita M. Ault
*Attorney, Agent, or Firm*—King and Schickli

[57] ABSTRACT

A battery charger and associated method for charging a DC battery utilizes a step-down transformer with high leakage reactance, and means for rectifying and regulating the step-down transformer output to continuously supply a constant charging current to the battery. Feedback from a current sensing means in series with the battery is provided for determining proper regulation. A discharge current controller in parallel with the battery contains a load resistor and switching means electrically responsive to a pulse train generator. The discharge current is applied to the battery in a rapid succession of brief pulses throughout the entire charging cycle, with the discharge current pulses being superimposed over the charging current. The discharge current pulse duration is selected utilizing the pulse train generator, between 50 and 100 microseconds with a time period on the order of twenty times the pulse duration. The amplitude of the discharge pulses, fixed by selection of the load resistor, is approximately three times the magnitude of the average nominal charging current. The rapid application of high amplitude current for an extremely brief pulse duration induces electromagnetic forces within the battery. A turbulence is produced which advantageously scrubs the battery plates to remove hydrogen bubbles, so the entire plate surface is available for the redeposition of ions.

23 Claims, 1 Drawing Sheet

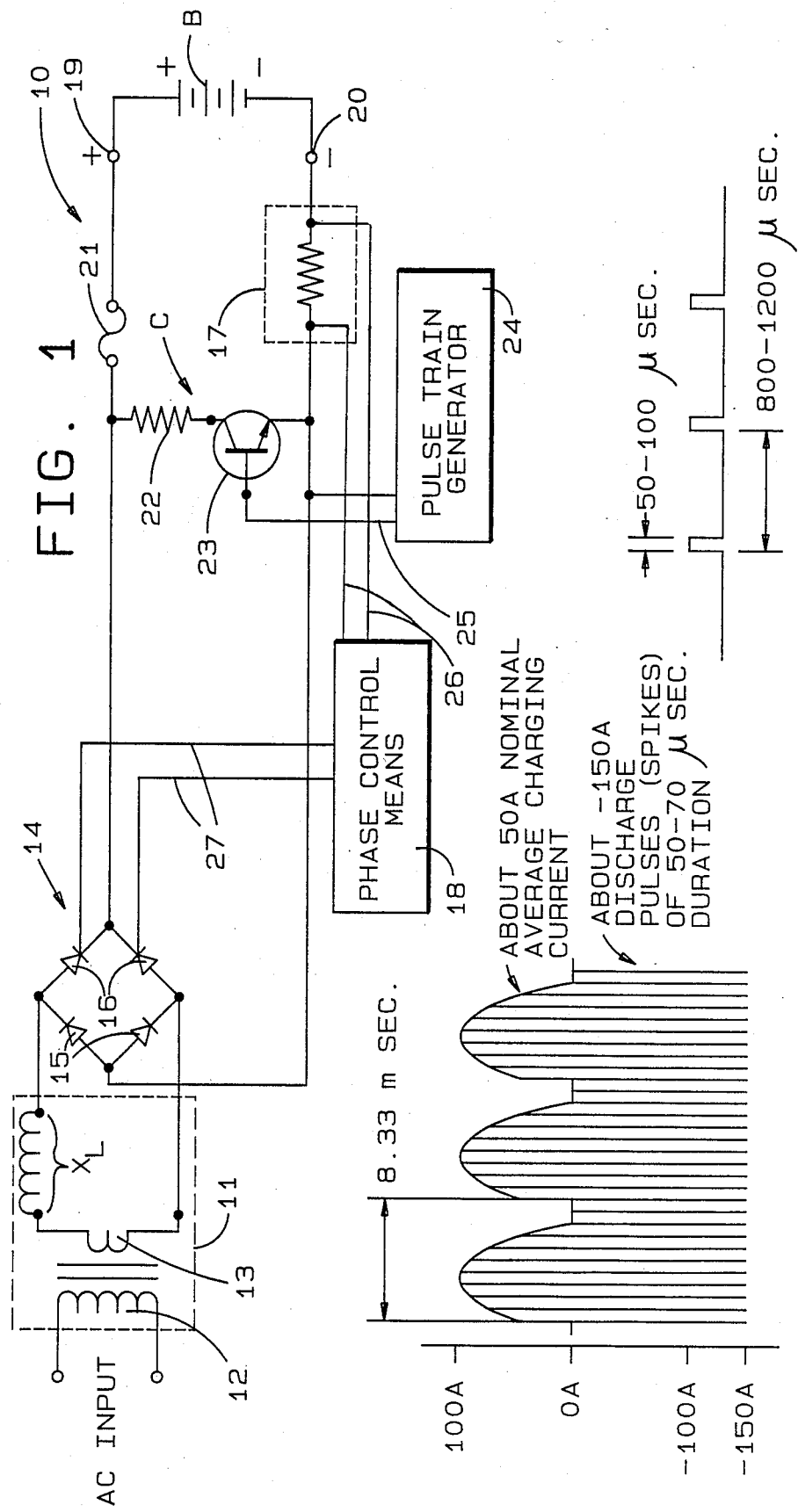

BATTERY CHARGING APPARATUS AND METHOD

BACKGROUND OF THE INVENTION

The present invention relates to a DC battery charger, and more particularly to a charging circuit that continuously supplies unfiltered charging current to the battery with brief high frequency, high amplitude discharging current pulses superimposed on the charging current wave form.

As is well known, continuous application of a charging current to a DC battery initially is very efficient, with the supplied energy generating the proper chemical changes within the battery. However as charging continues, the efficiency eventually begins to decrease due to the increasing internal resistance of the battery. If charging current alone is maintained, eventually the plates will overheat and warp, causing the battery to short out internally.

These problems have been addressed by various elaborate methods, usually including the application to the battery of a discharge current of considerable duration, while the charging current is interrupted. For example, Tichenor, U.S. Pat. No. 2,503,179, requires interruption of the charging current before application of a discharging current to the battery. One significant disadvantage of these schemes, is the necessity for a heavy duty switch capable of repeatedly interrupting the charging current.

Another significant disadvantage has been the elaborate control schemes employed to determine when the charging current should be interrupted. For example Mas, U.S. Pat. No. 3,816,806, requires the battery to have an opening to the atmosphere for monitoring the rate of gas evolution within the battery. Then the charging current is regulated accordingly. Such physical intrusion into the battery is not only time-consuming, but on a regular basis may greatly increase the opportunity for the introduction of contaminants from the environment into the battery.

Another disadvantage has been the necessity of storing the discharge current for later introduction into the battery during the charging portion of the cycle, to maintain charger efficiency. For example, Steigerwald, U.S. Pat. No. 4,211,969, utilizes a storage capacitor 18 to store the discharge energy and two chopper circuits to control the system.

Of significant disadvantage is the relatively long duration of the discharge pulse in the prior battery systems. This long duration requires excessively heavy electrical components, with a large cross sectional area, capable of carrying the large current and dissipating the heat generated by the resistive losses of the components ($I^2R$ losses).

Some battery charging systems compound the heating problem by increasing the duration of discharge pulses after the battery voltage has risen above a given value, approaching a full charge status. For example DuPuy, U.S. Pat. No. 3,617,851, teaches that at 90% of full charge, the charge duration would be 1 second and the discharge duration 10 seconds. The discharge duration then increases to 60 seconds at the fully charged state.

Present battery charging systems utilize the discharging current merely for the chemical reactions that it causes. For example, Tichenor, U.S. Pat. No. 2,503,179, merely teaches that the discharge current removes some of the redeposited ions to attain a smooth, dense deposit on the battery electrodes or battery plates.

SUMMARY OF THE INVENTION

Accordingly, it is the primary object of the present invention to provide an improved battery charging system and related method for charging DC batteries.

Another object of the present invention is to provide a battery charging system and method that does not allow the excessive buildup of hydrogen bubbles on the battery plates, which could lead to permanent battery damage during charging.

A further object of the present invention is to provide a continuous charging current to the battery, without the need for interruption during discharging.

Still another object of the present invention is to provide a battery charging circuit that does not require storage capacity for the discharge current energy and does not require excessively heavy electrical components to dissipate heat generated by resistive losses of the components due to high levels of discharge current flowing therethrough for relatively long durations of time.

Another object of the present invention is to provide a battery charging system wherein the charging current is constantly applied to the battery, and the discharging current is simultaneously applied in pulses at a constant frequency.

Additional objects, advantages and other novel features of the invention will be set forth in part in the description that follows, and in part will become apparent to those skilled in the art upon examination of the following, or may be learned through the practice of the invention. The objects and the advantages of the invention may be realized and attained by means of the instrumentalities and combinations particularly pointed out in the appended claims.

In order to achieve the foregoing and other objects, and in accordance with the purposes of the present invention as described herein, an improved battery charging system is provided for efficiently and rapidly charging DC batteries and extending battery life.

In one aspect of the invention, a step-down transformer is provided to convert AC input line voltage to a suitable secondary voltage. The secondary voltage is then rectified, with phase control applied to supply a constant and continuous charging current as the battery voltage increases with charging. Proper phase control is determined by monitoring the current flowing through the battery. Means for limiting the current, placed in series with the battery, is also recommended.

In a further aspect of this invention, brief pulses of discharging current are superimposed upon the charging current waveform. A discharge current controller is provided in parallel with the battery, having a resistor in series with an electrical switching means. The resistor dissipates the battery discharge energy as heat when the electrical switching means allows discharge current to flow.

As a further aspect of this invention, the discharge current is allowed to flow for a pulse duration selected between 50 and 100 microseconds. This brief discharge pulse is repeated at a time period on the order of twenty times the pulse duration. The specific pulse duration and period of repetition can easily be determined by one skilled in the art, as these parameters vary with the particular type, size and style of battery being charged.

In a further specific aspect of this invention, the step-down transformer chosen is one having a relatively high leakage reactance with a sufficient inductive component to induce an electromotive force that opposes the rapid change in current caused by the discharge current pulsation. The high leakage reactance of the step-down transformer will prevent the flow of power from the AC line input source through the discharge circuit controller, ensuring that only current from the battery flows therethrough. The blocking action of the chosen step-down transformer is a consequence of the high rate of change of current caused by the rapid cycle of the discharge current pulses.

A further signficant aspect of this invention that necessitated the choice of rapid discharge pulses of relatively short duration, is the production of turbulence in the electrolyte. The increasing internal resistance of the battery during charging is caused by the build-up of hydrogen bubbles on the surface of the battery plates, a byproduct of the chemical reactions. Turbulence in the electrolyte actively scrubs the bubbles from the plates.

The turbulence within the battery is the result of electromagnetic forces, efficiently caused by the rapid discharge current pulses. The mechanical turbulent action of the electrolyte effectively scrubs away any hydrogen bubbles that may have accumulated upon the battery plates. This turbulence is continued throughout the battery charging cycle to continuously cleanse the battery plates. With the hydrogen bubbles continuously removed, ions within the electrolyte are free to be deposited over greater areas of the battery plates, unimpeded by the presence of hydrogen bubbles. This allows the battery to reach full voltage faster, and with less heating problems due to high current densities in a few spots, whereby damage to the battery is prevented.

The discharge current must be a relatively high amplitude, roughly three times the charging current amplitude, which is approximately −150 amperes in the preferred embodiment.

In utilizing this system to charge batteries, a few bubbles of hydrogen will be observed continuously throughout the charging cycle, whereas in other systems the hydrogen bubbles are not evident early in the cycle. The bubbles become apparent to the naked eye near the end of the charging cycle when excessive heat has developed in the battery. In prior art systems, a dangerous condition can develop because the electrolyte begins boiling and a runaway situation is initiated. Serious injury to operating personnel from contact with the acidic electrolyte solution is possible.

Still other objects of the present invention will become readily apparent to those skilled in this art from the following description wherein there is shown and described a preferred embodiment of this invention, simply by way of illustration of one of the modes and alternative embodiments best suited to carry out the invention. As it will be realized, the invention is capable of other, different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain the principles of the invention. In the drawings:

FIG. 1 is a schematic representation of the battery charger circuit;

FIG. 2 is graph of the typical output of a pulse train generator, supplying a drive pulse to the discharge controller switching means, showing the duration and period of the drive pulses which correspond to the duration and period of the discharge current;

FIG. 3 is a graph representing the nominal charging current of the preferred embodiment produced by a single phase AC input source, with the negative discharge current pulses superimposed thereon as vertical lines.

Reference will now be made in detail to the present preferred embodiment of the invention, an example of which is illustrated in the accompanying drawings.

DETAILED DESCRIPTION OF THE INVENTION

With reference now to FIG. 1 of the drawings, there is shown a circuit 10 including a step-down transformer 11 having a primary winding 12, a secondary winding 13, and an effective series leakage reactance, $X_L$. AC input power is applied to the primary winding 12. While FIG. 1, and later to be discussed FIG. 3, depict this AC input power as single phase, it should be made clear that this invention is not limited thereto, but this is merely a description of the preferred embodiment. Three phase AC input power or the like would be suitable. Also while FIG. 3 depicts the resultant wave from a 60 Hertz AC input source, the operation of the circuit is not dependent thereon. Other AC input frequencies, such as 50 Hertz, will adequately power this circuit.

In FIG. 1, the symbol $X_L$ shown in series with the secondary winding 13, denotes the equivalent leakage reactance of the step-down transformer as viewed from the secondary winding terminals. The specific choice of the step-down transformer in relation to $X_L$ will be explained in more detail below.

The alternating current from the secondary winding 13 is rectified into a DC current by a SCR (Silicon Controlled Rectifier) full wave bridge forming a rectifying and regulating means 14. The SCR bridge is composed of two diodes 15, and two SCR's 16. The SCR's are triggered into a conducting mode by a standard phase control means 18 in a manner which will be explained in more detail below.

Means for connecting a battery B to the circuit 10 are provided. Specifically, a positive output terminal 19, delivering the SCR output, is provided for connection with a positive battery terminal. Similarly, a negative output terminal 20, delivering input to diodes 15, is provided for connection with a negative battery terminal.

Means for limiting the current, shown as a fuse 21 in series with the battery, is recommended. While not essential to the normal functioning of the charger, this means for limiting current provides protection for both the circuit and the battery B during an emergency situation.

As the battery voltage increases during normal charging, the rectifying and regulating means must respond to this situation, and continue to provide a constant average charging current to the battery. This is accomplished by regulating the time at which the SCR's 16 receive a triggering signal to enter the conducting mode. The triggering signal is supplied from the phase control means 18 through signal lines 27.

The phase control means 18 monitors the current through the battery B via a feedback line 26 from the output of a current sensing means 17, in series with the battery. In the preferred embodiment, the current sensing means 17 is a current shunt in series with the battery.

A discharge current controller C is provided in the circuit 10 in accordance with the invention, and is connected in parallel with the battery B. A load resistor 22 in series with a switching means, shown in the preferred embodiment in FIG. 1 as a discharge transistor 23, are contained in the discharge current controller. The resistance of the load resistor 22 is chosen to allow a discharge current of approximately three times the magnitude of the charging current to flow therethrough. In the preferred embodiment, a 0.25 ohm resistor allows a discharge current of approximately −150 amps to flow when the discharge transistor 23 is in its conducting state.

The discharge transistor 23 enters a conducting state upon receipt of a drive pulse from a pulse train generator 24 through connecting line 25. While the transistor 23 is depicted in FIG. 1 schematically as being a single transistor, the broadest aspects of the invention are not limited thereto. In an alternative embodiment, the discharge transistor 23 may be composed of two discrete transistors connected as a Darlington pair amplifier. Also, other electrically responsive switching means, such as an SCR, could be substituted for the discharge transistor 23.

The pulse train generator 24 must be adjustable to attain the advantageous control effects associated with the present invention. The range of adjustment required is 50-100 microseconds for the drive pulse duration, and 800-1,200 microseconds for the total period of the drive pulses. The amplitude of the drive pulse delivered from the pulse train generator 24 must be sufficient to cause the transistor 23 to enter the conducting state. FIG. 2 depicts the drive pulse wave form applied.

In accordance with an important aspect of the invention, the ratio of the period of the drive pulse to the duration of each individual drive pulse is on the order of 20:1. This pulse to period ratio of the drive pulse generates an equal ratio of the period of the discharge current flow to the duration of each discharge current pulse. In the preferred embodiment the discharge current would flow for a duration of 60 microseconds. Although an exact ratio of 20:1 yields a time period of 1,200 microseconds, a period of 1,000 microseconds is used in the preferred embodiment. Hence, it can be seen that the stated ratio of 20:1 is illustrative, and not restrictive. The invention functions as desired over the range of 50-100 microseconds of discharge current pulse duration, with a period in the range of 800-1,200 microseconds.

Now the novel and unique manner in which the circuit components function to charge a DC battery in a more efficient manner than heretofore known, will be explained.

In the prior art it is well known that sporadic application of discharge current during the battery charge cycle significantly increases the efficiency of the charging system. However, when applying the discharge current, these systems interrupt the charging current flowing to the battery. They also employ an extremely long time period between successive applications of discharge current. This, in combination with the extremely long time that the discharge current is allowed to flow, does not accomplish the efficiencies of my invention. In fact, some battery charging systems such as DuPuy (U.S. Pat. No. 3,617,851), actually taught away from my invention by increasing the discharge period over the charging cycle to near 60 seconds at full charge. These prior systems merely seek to utilize the chemical reactions produced at the battery plate by the discharge current, for example, to smooth the surface of the plates for more even redeposition of the ions during a charging portion of the cycle.

The real problem that hampers the efficiency of the charge cycle is the buildup of small bubbles of gaseous hydrogen on the surface of the battery plates. The bubbles are a byproduct of the chemical reaction where the ions in the electrolyte are redeposited on the surface of the battery plates. The hydrogen bubbles clinging to the plates effectively insulate them by blocking the redeposition of additional ions. Hence, such ions flow only to exposed areas on the battery plates. As the concentration of hydrogen bubbles on the plate surface increases, the effective area remaining for the charging current to flow through, and redeposit charging ions thereon, is decreased. This increases the current density in the exposed areas, which in turn generates hot spots on the battery plate. The overall effect is an increased internal battery resistance, which decreases the efficiency of the charger system, and a deleterious overheating condition in the battery.

I have discovered that charger efficiency is greatly enhanced when the hydrogen bubbles are systematically removed from the surface of the battery plates. To accomplish this, the novel manner of discharge current application of the invention generates a mechanical turbulence within the electrolyte, which scrubs the bubbles from the plates. To cleanse the plates of the accumulated hydrogen bubbles, the discharge current is applied in a rapid fashion (every 800-1,200 microseconds) and for a very short duration (50-100 microseconds). Within the battery B, this rapidly changing current causes time varying electromagnetic forces which produce a turbulence in the electrolyte. The turbulent electrolyte mechanically removes the hydrogen bubbles, leaving the battery plates exposed for increased, and even redeposition of ions.

In choosing the discharge current period and duration to accomplish the mechanical turbulent cleansing of the hydrogen bubbles from the battery plates, several other advantages are recognized.

The rapid application of extremely brief pulses of discharge current to the battery B allows circuit components, load resistor 22 and switching means 23 to operate at a much cooler temperature, thereby increasing component life. The brief duration of the discharge current flow is not long enough to allow the components to heat up thermodynamically, to the extent observed in the discharge components of other battery charging systems. The lower resistive heat losses in the discharge components also increases the overall operating efficiency of the battery charger circuit 10.

Since minimal energy is lost during discharging there is no need to include a capacitor or other means for storing the discharge energy, for later application back into the battery during the charging portion of the cycle. This contributes to more economical construction of the battery charger because not only is the storage component eliminated, but so are the related switching elements and controls.

The rapid application of extremely brief discharge current pulses in combination with proper selection of the step-down transformer 11, allows elimination of means for interrupting the charging current during the discharge cycle. To assure that the discharge current flowing through the discharge current controller is substantially from the battery, and not the AC power input source, the step-down transformer 11 is chosen to have a relatively high leakage reactance, $X_L$. The inductive component of the leakage reactance, $X_L$, induces an electromotive force which opposes rapid changes in current, and the opposition increases as the rate of change of current increases. Hence, it can be seen that the step-down transformer 11 acts substantially like a switch during the rapid discharge current pulses, isolating the discharge current controller from the AC input power source.

The choice of the step-down transformer with a proper leakage reactance, $X_L$, will be readily apparent to one skilled in the art after minimal experimentation to accomplish the desired result. Transformers with the requisite high leakage reactance are commonly available at economic prices, as opposed to expensive precision-wound transformers with a low leakage reactance. A relatively high leakage reactance results when the step-down transformer 11 is constructed with the primary winding 12 not tightly magnetically coupled to the secondary winding 13. This is accomplished by winding the primary and secondary winding coils relatively loosely around the transformer magnetic core.

Elimination of the need for interrupting the charging current during the discharge current pulse, allows the discharge current to be superimposed upon the charging current flowing through the battery. The resultant battery current wave form is shown in FIG. 3, for the preferred embodiment of the invention. The amplitudes of current shown in FIG. 3 should not be considered as restrictive of the invention, merely illustrations of the preferred embodiment, wherein a battery of 18 cells, with two volts per cell, and a rating of 180 ampere-hours is being charged.

Another advantage of the rapid application of extremely brief discharge current pulses to the battery B, is that battery charging takes place at a cooler internal battery temperature than attainable using other battery charging systems. Although the amplitude of the discharge current pulses is relatively high, being approximately three times the amplitude of the charging current, only a minimal amount of heat is generated by the internal resistance of the battery. This is due to the short duration of each discharge current pulse.

The maximum effective discharge pulse duration is near 100 microseconds. Discharge current pulses significantly greater than 100 microseconds in duration increase heating within the battery from increased resistive losses. Another effect of discharge pulse durations greater than 100 microseconds is that line current is allowed to flow through the discharge current controller as the step-down transformer 11 begins to react to the discharge current. Hence, the isolation properties supplied by the leakage reactance, $X_L$, are no longer realized.

Similarly, the minimum effective discharge pulse duration is near 50 microseconds, but this limitation is imposed by the dynamic characteristics of the electrolyte. Pulse durations significantly less than 50 microseconds are not long enough to allow the electrolyte to react, hence the desired turbulence is not produced.

Methods for selecting the proper amplitude of charging current for a specific type and size of battery being charged, are well known to one skilled in the art. In the preferred embodiment, the 50 amperes average nominal charging current was chosen to charge a battery of 18 cells, with two volts per cell, rated at 180 ampere hours. Once the average nominal value of the charging current is established, the amplitude of the discharge current pulses is then determined to be approximately three times that value. This high amplitude of discharge current produces electromagnetic forces within the battery of a magnitude sufficient to induce the required electrolyte turbulence to cleanse the hydrogen bubbles from the surface of the battery plates.

A further advantage of this battery charging system is that the batteries are capable of being charged to 95-98% of their total capacity. Other battery charging systems are only able to charge to a maximum of 80-90% of the total capacity. Hence the batteries charged by the system and method of my invention have a significantly longer life than if charged using other systems.

The invention also encompasses a method of charging a DC battery. The first step includes stepping-down a voltage from an AC power source, then rectifying this stepped-down voltage. Then either simultaneously with the rectifying or subsequent thereto, the current is regulated to continuously supply a charging current of constant magnitude to the battery. Concurrent with supplying charging current to the battery, the discharge current pulses are superimposed over the charging current a rapid succession of extremely brief discharge current pulses are applied at a constant interval. Simultaneous with the application of a discharge current pulse, the AC power source is isolated by utilizing a relatively high leakage reactance characteristic of a transformer performing the stepping-down step.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, if a step-down transformer is chosen with a relatively low inductive reactance, $X_L$, a series blocking inductor may be placed between the SCR bridge 14 and the discharge current controller C. This would substantially block the flow of power from the AC input source through the discharge controller during a discharge current pulse. The embodiment was chosen and described to provide the best illustration of the principles of the invention and its practical application to thereby enable one of ordinary skill in the art to utilize the invention. Utilization can be in various embodiments and with various modifications as are suited to the particular use contemplated. It is intended that the scope of the invention be defined by the claims appended hereto.

We claim:

1. A battery charger for a DC battery to be supplied by a primary AC power source, comprising:
   a stop-down transformer;
   means for rectifying and regulating the output from the step-down transformer to produce a charging current of substantially constant magnitude;
   means for generating a rapid succession of brief discharge current pulses;
   means for directly superimposing said discharge current over said charging current;

means for controlling said discharge current in parallel with the battery, including a load resistor to fix the discharge current amplitude responsive to said generating means; and means for substantially continuously isolating the AC power source during application of the discharge current pulse;

whereby accumulated hydrogen bubbles are actively scrubbed from the plates within the battery.

2. A battery charger as set forth in claim 1 wherein said isolating means includes said step-down transformer having a leakage reactance sufficiently high to block the flow of power from the AC power source through the means for controlling discharge current during a discharge current pulse.

3. A battery charger as set forth in claim 1, wherein said means for rectifying and regulating comprises:
a full wave bridge rectifier with a diode and an SCR;
means for sensing the magnitude of the charging current applied to the battery;
means for determining the proper time to send a triggering signal to the SCR to maintain a constant charging current as monitored by said current sensing means;
a feedback line from an output of said current sensing means to an input of said determining means to provide a feedback signal; and
a signal line for connecting the output of said determining means to the SCR for application of the triggering signal.

4. A battery charger as set forth in claim 1, wherein said means for generating the discharge current comprises:
a pulse train generator to supply a drive pulse; and
means for switching in series with the load resistor, responsive to the drive pulses to apply the discharge current pulses to the battery;

5. A battery charger as set forth in claim 1, wherein the discharge current pulses are applied in rapid succession with a time period selected between 800 and 1,200 microseconds.

6. A battery charger as set forth in claim 1, wherein the means for superimposing includes means for connecting said controlling means for the discharge current to said rectifying and regulating means producing said charging current, whereby the superimposing causes said discharge current to be added to said charging current.

7. A method of charging a DC battery, comprises the steps of:
stepping-down a voltage from an AC power source;
rectifying the stepped-down AC voltage;
regulating a rectified current to continuously supply charging current of constant magnitude to the battery;
superimposing over the charging current a discharge current pulse;
repeating the application of the discharge current pulse at a constant interval; and
isolating the AC power source during application of the discharge current pulse utilizing a relatively high leakage reactance characteristic of a transformer performing said stepping-down step.

8. The method of charging a DC battery as set forth in claim 7 wherein said regulating step occurs simultaneously with said rectifying step.

9. A method of charging as set forth in claim 7, wherein said repeating step occurs at an interval selected from the range of 800–1,200 microseconds.

10. A battery charging method as set forth in claim 7, wherein the duration of the discharge current pulses is selected between 50 and 100 microseconds.

11. A battery charging method as set forth in claim 7, wherein the discharge current pulses are applied in rapid succession with a time period on the order of twenty times the pulse duration.

12. A battery charging method as set forth in claim 7, wherein the discharge current pulses each have a duration of 60 microseconds and are applied with a time period of 1,000 microseconds.

13. A battery charging method as set forth in claim 7, wherein said discharge current pulses have an amplitude on the order of three times the amplitude of the charging current.

14. A battery charger for a DC battery to be supplied by a primary AC power source, comprising:
means for generating a rapid succession of brief discharge current pulses;
means for controlling a discharge current in parallel with the battery, including a load resistor to fix the discharge current amplitude responsive to said generating means;
a step-down transformer having an leakage reactance sufficiently high to block the flow of power from the AC power source through the means for controlling discharge current during a discharge current pulse; and
means for rectifying and regulating the output from the step-down transformer to produce a charging current of substantially constant magnitude;
whereby accumulated hydrogen bubbles are actively scrubbed from the plates within the battery.

15. A battery charger as set forth in claim 14, wherein said means for regulating and rectifying comprises:
a full wave bridge rectifier with a diode and an SCR;
means for sensing the magnitude of the charging current applied to the battery;
means for determining the proper time to send a triggering signal to the SCR to maintain a constant charging current as monitored by said current sensing means;
a feedback line from an output of said current sensing means to an input of said determining means to provide a feedback signal; and
a signal line for connecting the output of said determining means to the SCR for application of the triggering signal.

16. A battery charger as set forth in claim 14, wherein said means for generating the discharge current comprises:
a pulse train generator to supply a drive pulse; and
means for switching in series with the load resistor responsive to the drive pulses to apply the discharge current pulses to the battery.

17. A battery charger as set forth in claim 16, wherein the duration of the discharge current pulse is selected between 50 and 100 microseconds.

18. A battery charger as set forth in claim 17, wherein the discharge current pulses are applied in rapid succession with a time period on the order of twenty times the pulse duration.

19. A battery charger as set forth in claim 16, wherein said discharge current pulses have an amplitude on the order of three times the amplitude of the charging current.

20. A battery charger as set forth in claim 19, wherein the discharge current pulses each have a duration of 60 microseconds and are applied with a time period of 1,000 microseconds.

21. A battery charger as set forth in claim 16, wherein the discharge current pulses are applied in rapid succession with a time period selected between 800 and 1,200 microseconds.

22. A battery charger for a DC battery to be supplied by a primary AC power source, comprising:
   a step-down transformer;
   means for rectifying and regulating the output from the step-down transformer to produce a charging current of substantially constant magnitude;
   means for generating a rapid succession of brief discharge current pulses;
   means for controlling said discharge current in parallel with the battery, including a load resistor to fix the discharge current amplitude responsive to said generating means;
   said means for rectifying and regulating including a full wave bridge rectifier with a diode and an SCR;
   means for sensing the magnitude of the charging current applied to the battery;
   means for determining the proper time to send a triggering signal to the SCR to maintain a constant charging current as monitored by said current sensing means;
   a feedback line from an output of said current sensing means to an input of said determining means to provide a feedback signal;
   a signal line for connecting the output of said determining means to the SCR for application of the triggering signal; and
   said current sensing means comprising a current shunt in series with the battery;
   whereby accumulated hydrogen bubbles are actively scrubbed from the plates within the battery.

23. A battery charger for a DC battery to be supplied by a primary AC power source, comprising:
   a step-down transformer;
   means for rectifying and regulating the output from the step-down transformer to produce a charging current of substantially constant magnitude;
   means for generating a rapid succession of brief discharge current pulses; and
   means for controlling said discharge current in parallel with the battery, including a load resistor to fix the discharge current amplitude responsive to said generating means;
   said means for generating the discharge current including a pulse train generator to supply a drive pulse;
   means for switching in series with the load resistor, responsive to the drive pulses to apply the discharge current pulses to the battery; and
   said switching means including a discharge transistor;
   whereby accumulated hydrogen bubbles are actively scrubbed from the plates within the battery.

* * * * *